United States Patent [19]

Setton et al.

[11] Patent Number: 4,835,346
[45] Date of Patent: May 30, 1989

[54] METHOD AND DEVICE FOR FAST DATA TRANSMISSION THROUGH A STANDARD SERIAL LINK

[75] Inventors: Joel Setton, Brignoud; Jean-Marc Laugenie, Grenoble, both of France

[73] Assignee: Hewlett-Packard Company, Palo Alto, Calif.

[21] Appl. No.: 94,958

[22] Filed: Sep. 8, 1987

[30] Foreign Application Priority Data

Nov. 28, 1986 [FR] France ............................. 86 17009

[51] Int. Cl.[4] .......................................... H04G 13/08
[52] U.S. Cl. .................. 178/17.5; 178/2 R; 178/3; 364/200
[58] Field of Search ............... 178/2 R, 3, 4, 79, 17.5; 364/200

[56] References Cited

U.S. PATENT DOCUMENTS 4,736,074 4/1988 Sendlinger et al. ............ 178/17.5 X

OTHER PUBLICATIONS

IBM Technical Disclosure Bulletin, vol. 18, No. 4, Sep. 1975, Host Interface Communications and Control Unit Emulation, (M. P. Loughlin and J. R. Maresca), p. 1251.
IBM Technical Disclosure Bulletin, vol. 19, No. 10, Mar. 1977, Enhanced I/O Subsystem Using a Device Engine, (D. F. Bantz, L. A. Belady and C. J. Evangelisti), p. 4043.
IBM Technical Disclosure Bulletin, vol 9, No. 170, (p. 373) (1893) Jul. 16, 1985, Data Transfer Circuit, (Hiroshi Nishimatsu).

Primary Examiner—Stafford D. Schreyer
Attorney, Agent, or Firm—Alan H. Haggard

[57] ABSTRACT

A device for transmitting data between a transmitter provided with standard software adapted to a serial interface and a standard receiver provided with a serial interface is presented. The device includes a serial interface simulator which replaces the serial interface of the transmitter, a memory which stores data received by the serial interface simulator, and an interface which transmits to the receiver the data stored in the memory. The serial interface simulator includes a data transmission register, a data reception register, a first buffer register, a second buffer register, a bus, a simulation control register and a simulation state register.

The standard software places data in the data transmission register and receives data from the data reception register. Data placed in the data transmission register is not immediately serially transmitted to the receiver, but is transferred to the first buffer register from where it is transferred to the memory. The data stored in the memory is later transmitted through the interface to the receiver. Data placed in the data reception register, and data in the simulation control register and simulation state register are manipulated in such a way that the standard software places data in the data transmission register at a high data transfer rate.

7 Claims, 4 Drawing Sheets

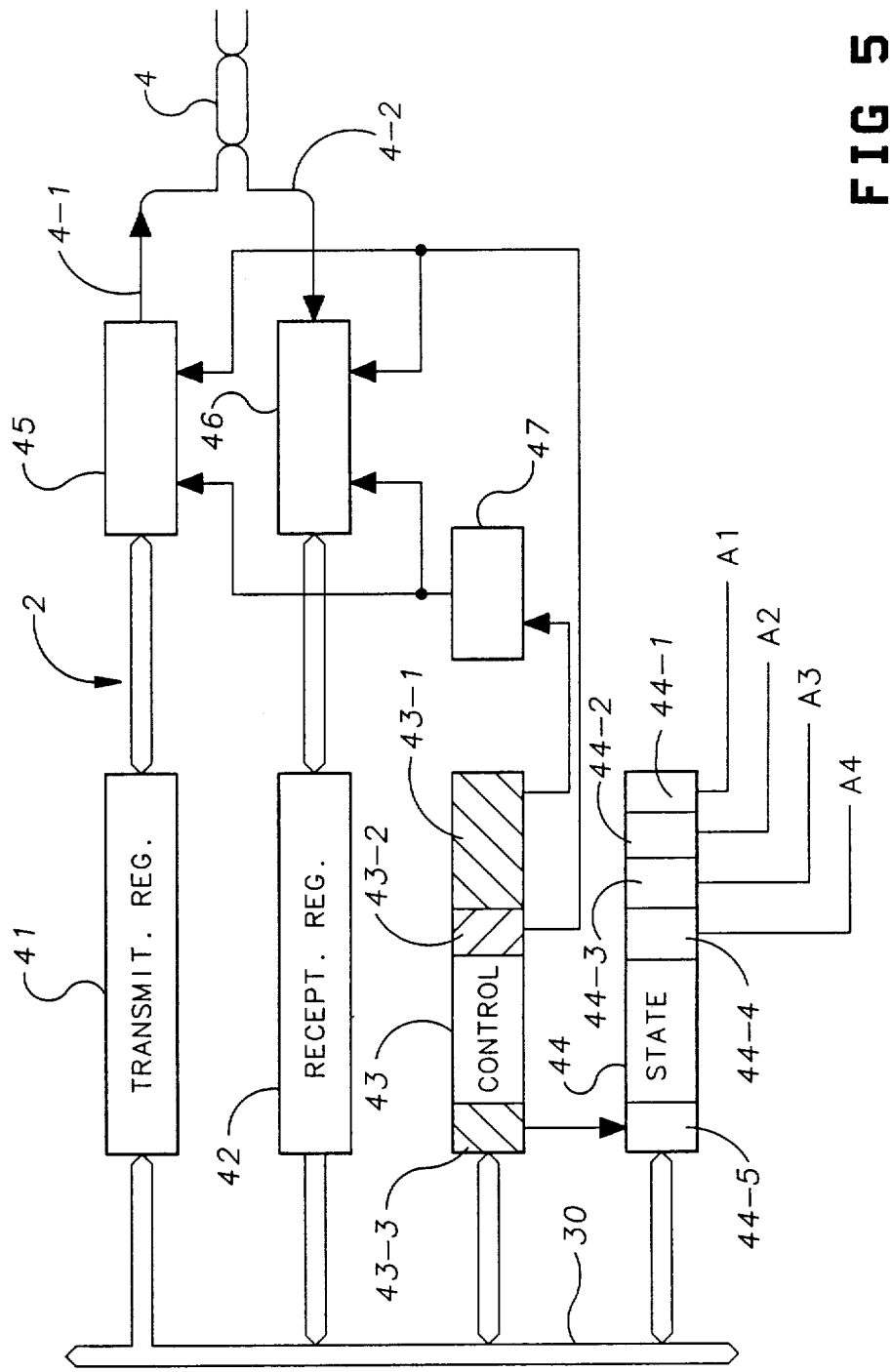

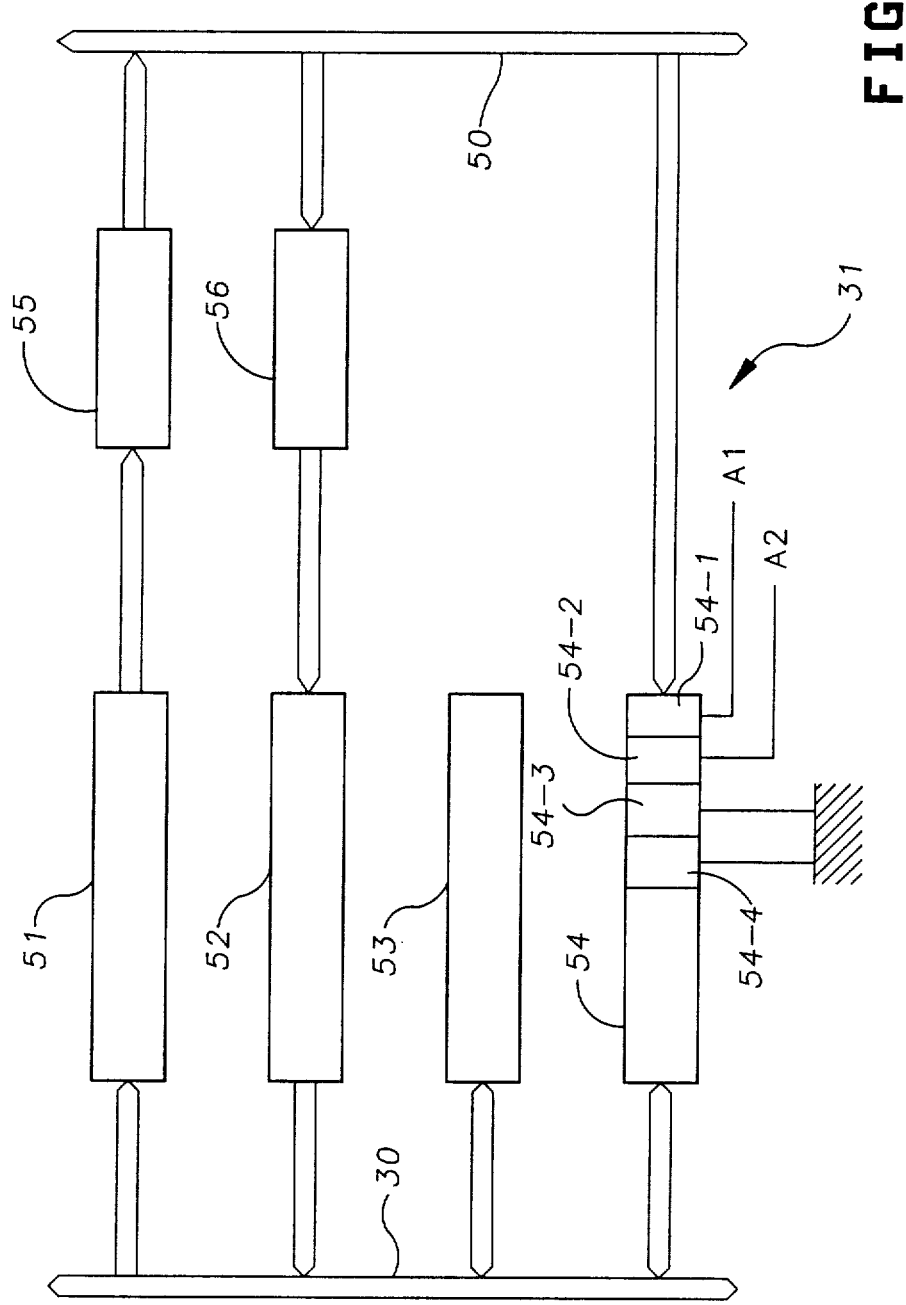

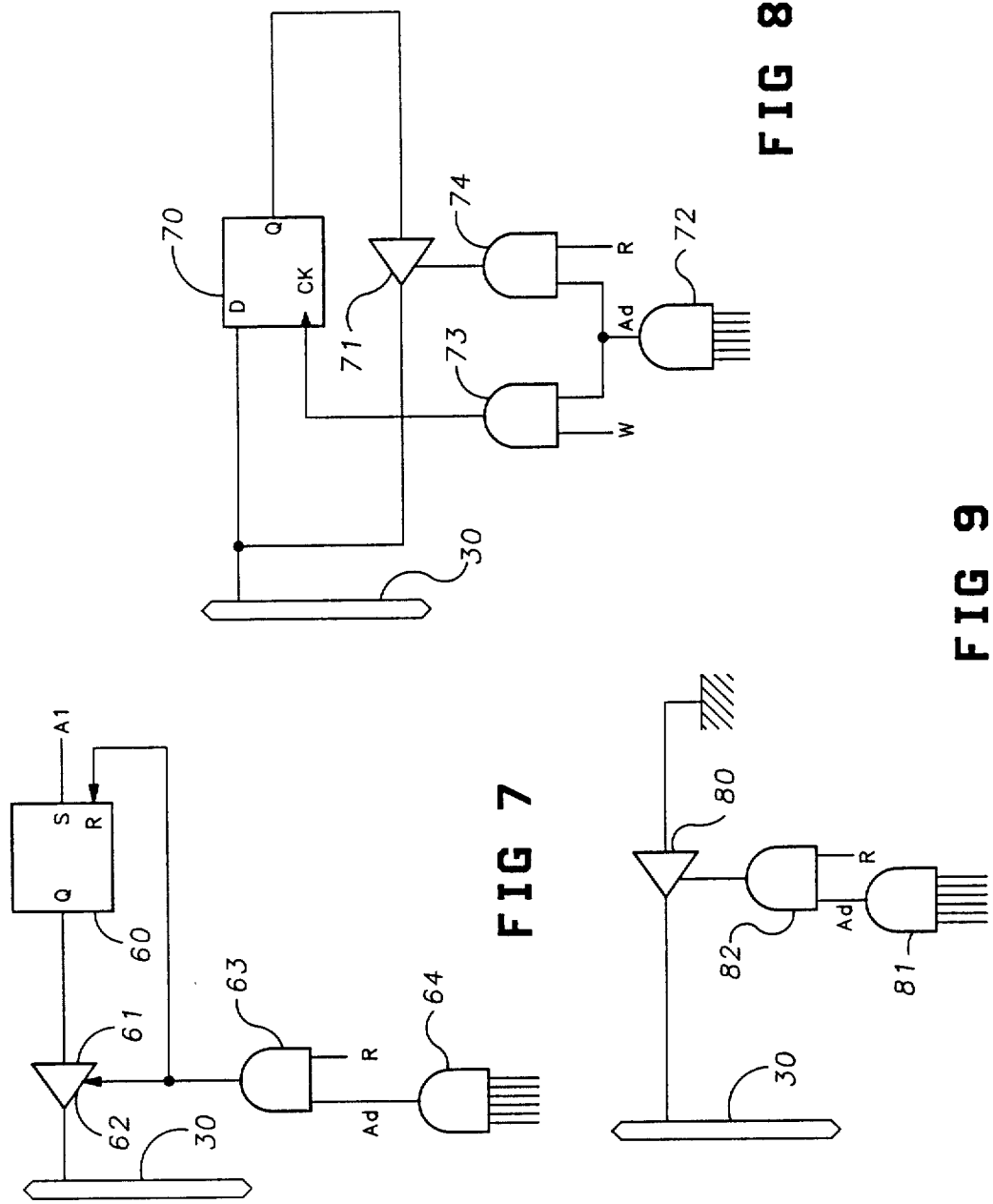

METHOD AND DEVICE FOR FAST DATA TRANSMISSION THROUGH A STANDARD SERIAL LINK

The instant invention relates to the field of computer and more specifically to the communications between an host computer and a peripheral system.

We shall consider, for example, the connection between a personal computer and a peripheral system such as a printer but it will be clear that the instant invention applies to the communication between other devices, the first one having a faster operating rate than the second one.

In case of a communication between a personal computer and a printer, one has to choose a serial, two-wire or three-wire, link, to have distances greater than an order of ten meters between said two elements. This type of link is presently a Standard generally available for typical personal computer software.

One drawback of a serial link is that the transmission speed is necessarily limited, for example to a speed of 9,600 baud, that is 9,600 bits per second. So, a character that is generally expressed by a ten-bit code (one start bit, 8 significative bits and one stop bit) is transmitted in 10/9,600 seconds, that is about one millisecond. This rate is generally sufficient for a printer but, during the whole transmission duration, the emitter (the personal computer) software which is in charge of this link has to wait for the acknowledgment indicating it may send the following word. There results a long time during which the software is occupied and the personal computer cannot carry out other tasks. As an example, in the above case and for a page of one million points, the transmission time duration is in the range of 100 seconds.

Conventional means for increasing the transmission rates consist in using parallel interfaces. A basic drawback of such an interface lies in the fact that the communication between the two connected elements is made through a cable with a great number of wires, so that the transmission distances are necessarily limited. Additionally, the corresponding software needs to be written specifically for the task and thus will not allow the use of a given peripheral system with a large number of conventional computer software programs.

An object of the instant invention is to reduce the operating time of the emitting computer software without causing any change in the controlling software and to permit the use of a serial connection.

In order to attain this object and others, the invention provides for a data transmission method between an emitter provided with a standard software adapted to a serial interface and a standard receiver provided with a serial interface, comprising the following steps simulating a serial interface for the transmitter software storing in a RAM associated with a microprocessor the data from the transmitter and sending back thereto standard acknowledgment signals; and transmitting towards the receptor the signals stored in the RAM at the rate of the serial connection.

The invention also provides for implementing this method by means of a data transmission device for transmitting data between a transmitter provided with a standard software adapted to a serial interface and a standard receiver provided with a serial interface, further comprising a system for replacing the serial interface of the transmitter comprising the same inputs-outputs and comprising a serial interface simulator operating as a serial interface for the transmitter software; a RAM associated to a microprocessor for receiving at a high speed the data from the transmitter and sending back thereto through the simulator standard acknowledgment signals; and an interface for transmitting towards the receiver the data stored in the RAM at the rate of the serial connection.

Those objects, features and advantages and others of the instant invention will be explained in greater detail in the following description of preferred embodiments made in connection with the attached drawings wherein.

FIGURES

FIG. 5 is an exemplary block diagram of some elements of a conventional serial interface;

FIG. 6 is a schematical block diagram showing the modifications to the elements of FIG. 5 in a serial interface simulator according to the invention; and FIGS. 7, 8 and 9 are more detailed examples of shift register cells used in a serial interface simulator according to the invention.

Figure 1:
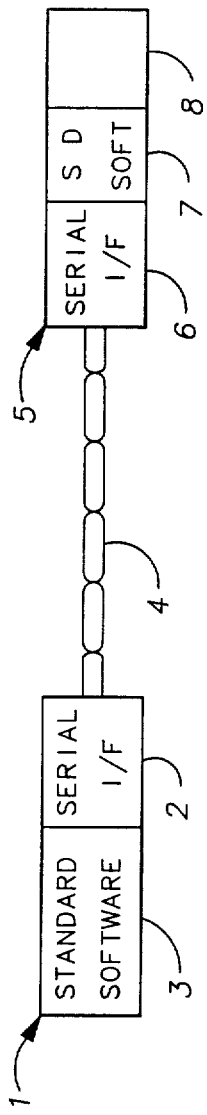
FIG. 1 is, a block diagram of a conventional serial link between a computer and a peripheral system.

As shown in FIG. 1, a conventional computer 1 comprises a serial interface board 2 controlled by the software 3 of the computer 1 for connection with peripherals, e.g. printers. The software associated with serial interfaces is presently developed according to classical standards to allow for exchange from one apparatus to the other. The serial link is made through a two-wire or a three-wire line 4 at a standardized rate, the fastest being presently in the range of 9,600 bauds. The receiving apparatus, for example a printer 5, comprises a receiving serial interface 6 symmetrical with respect to the transmitting serial interface 2, an interface standard software 7 and a mechanical part 8 controlled by this software. The advantage of such a structure is that it permits peripheral manufacturers to use standard interfaces and software for connection with any standard computer. However, as formerly indicated, the drawback of such devices lies mainly in the long transmission time and the resulting occupation time of the computer.

Figures 2, 3:
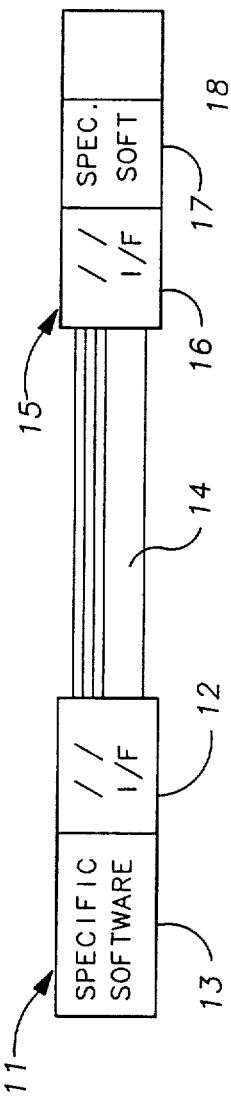
FIG. 2 is a block diagram of a conventional parallel link between a computer and a peripheral system.
FIG. 3 is a block diagram of a link according to the present invention,,n between an host computer and a peripheral system.

In order to accelerate the process and obtain the limit operating speed of the software 17, parallel interface links are used as shown in FIG. 2. Therefore, in the emitting computer 11, a parallel interface 12 controlled by a specific software 13 is provided. This interface transmits, through a plurality of wires 14, signals a parallel receiving interface at the peripheral system 15 through a parallel interface 16 connected with a specific software 17 controlling a mechanical part 18. The drawbacks of such a device are, first that specific software needs to be provided so that peripherals are no longer exchangeable, and second that a parallel link cannot be used over a long distance.

FIG. 3 schematically shows the basic feature of the present invention. According to the invention, one makes, as in the case of FIG. 1, a serial connection between an emitting computer 1 and a receiving peripheral 5 through a two-wire or three-wire line 4. The peripheral components are strictly identical to the ones of FIG. 1, that is the serial interface 6, the software 7 and the mechanical part 8 are not changed. Additionally, according to the invention, the standard software 3 of the emitting computer is not modified but classical serial interface 2 is changed to a new interface 22 comprised of a circuit board that replaces the interface board 2 of FIG. 1.

Figure 4:
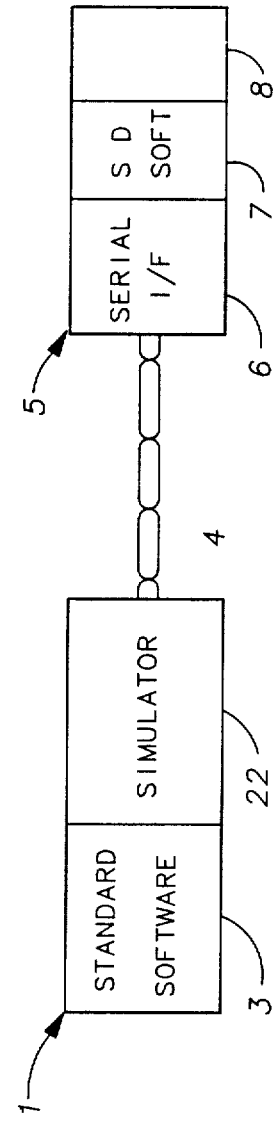
FIG. 4 is a block diagram showing the general aspect of a device according to the invention.

The general structure of this interface according to the invention is schematically shown in the block diagram of FIG. 4. This interface communicates with the software 3 through a bus 30 connected with a first block 31 which simulates a serial interface. This serial interface simulator receives all the signals emitted by the serial interface standard software and sends back all the signals formerly sent back by the serial interface but at a much faster rate. This simulator 31 communicates with a micro-computer 32 associated with a RAM 33. Thus, the data from the bus 30 is immediately stored in RAM 33 and acknowledgment signals such as normally sent back by a conventional serial interface are provided by the microprocessor 32 to the simulator 31 and through the bus 30 to the standard software 3. Accordingly, the data (successive characters in the case of a connection with a printer) provided by the software 3 to the printer are stored at a high speed in the RAM 33 while the standard software believes it is communicating at a slow rate with a normal serial interface. Then, the microprocessor 32 manages the transmission of data comprised in RAM 33 towards the serial connection 4 through a serial interface 34 while the computer 1 is freed.

The basic advantage of the system according to the invention lies in the fact that the standard software of a conventional computer and the peripheral elements are not modified. One only uses the fact that the serial interface standard software operate by sending commands or data and wait for an acknowledgment of those commands or data. This software is (gulled) by sending back very quickly the acknowledgment signal whereby the software immediately transmits the following data or command signal. Two cases may occur. First the standard software sends a data or command message that normally is used to store data in RAM 33. An acknowledgment signal is normally sent back. This operation is very fast. Second the standard software sends a message which has no utility in an application which is in accordance with the invention. For example, standard serial interface software transmits messages for controlling the data transmission rate on the serial line. For this type of message cells are provided for sending back gulling signals, whereby the software believes that the signal has been correctly received. One aspect of the present invention is to provide at the simulator 31, in addition to the transmission of the useful signals, an immediate acknowledgment of commands which are absolutely not used by the microprocessor 32 and the RAM 33. With the method according to the invention, it is possible to divide by duration between the sending of the signal and the return of the acknowledgment can be in the range of 10-2 ms instead of 1 ms as with the classical serial connection. This latter time duration is dependent upon the limitation associated with the transmission and also with the maximum operating speed of the printer.

FIG. 5 shows the schematical block diagram of the classical serial interface elements.

Such a serial interface is connected, on the one hand, to a bus 30 receiving a transmitting signal determined by the standard software 3 of a personal computer 1 and on the other hand, to a two-wire line of a serial connection 4. The bus 30 is shown as a single bus, but can be understood as comprised of a data bus, an address bus and a control bus. This bus is connected with registers such as a data transmission register 41, a data reception register 42, a control register 43 and a state register 44. Usually these registers are 8-bit registers.

The data transmission register 41 is connected with a serializer 45 transmitting output signals through a wire 4-1 of the two-wire line 4.

The data reception register 42 is connected with a deserializer 46 receiving bits from the receiving wire 4-2 of the serial connection 4.

The control or command register 43 is charged by the bus 30 with words of one or more bits for controlling the operation of the various elements of the system. For example, a word 43-1 of this register is connected with a speed generator 47 controlling the operating speed of the serializer 45 and deserializer 46. A control word 43-2 is provided for triggering a parity control in the data transmitted or received by the serializer 45 and the deserializer 46. A word 43-3 is a word controlling an interruption indicated to the state register 44.

The state register 44 also comprises a plurality of words, shown as single bits. That is the register 44 comprises one-bit cells. The cell 44-1 receives a signal Al from the serializer 45 for indicating that this serializer is empty. That is the word contained in the cell 44-1 has been transmitted. The cell 44-2 changes its state when it receives a signal A2 indicating that the deserializer 46 is full. That is an acknowledgment has been received on the wire 4-2. The cell 44-3 is activated when a signal A3 is received, indicating that a parity error exists. The state of cell 44-4 changes when it receives a signal A4 indicating a character has been lost in the transmission. And, as formerly indicated, the cell 44-5 is connected with the cell 43-3 of the control register.

Of course, the above indications are only particular examples of control words and state words provided in the greatest part of the serial interface and do not constitute a complete listing of those words.

The operation of this serial interface 2 is such that a personal computer software continuously interrogates through the bus 30 the state register 44. In particular, during each serial transmission phase, the bus interrogates cells 44-1 and 44-2 of register 44 in order to for check the content of the serializer and the deserializer. It is only when the serializer is emptied and the deserializer has received an acknowledgment signal that it is possible to transmit a further word in the serializer 45 and on the two-wire line 4.

According to the invention, as shown in FIG. 6, the prior art serial interface 2 is replaced by a serial interface simulator 31 also connected with the bus 30 that is controlled by the same standard software as the bus in FIG. 5. However, the interface simulator output, instead of being directly connected with a serial connection 4, is connected to a bus 50 connected with microprocessor 32 for charging RAM 33 shown in FIG. 4. Elements similar to the one connected to this bus in FIG. 5, that is a data transmission register 51, a data reception register 52, a control register 53 and a state register 54 are communicating with the bus 30.

The data transmission register 51, instead of being connected with the serializer, is connected with the second register 55 which communicates with the bus 50; in the same way, the data reception register 52 is connected with another register 56, which communicates with the bus 50 and the associated microprocessor 32. The control register 53 which formerly comprised control words provided through the bus 30 for controlling the operation of the board is presently simply a gulling register for causing the bus 30 to believe it communicates with a conventional serial interface. This register 53 no longer comprises connections with bus 30 for permitting, as in case of a conventional serial interface, the standard software to read again what has been written in the register. An embodiment of a gulling register cell will be shown hereinafter.

The state register 54 now communicates with buses 30 and 50. Some of its cells have the same functions as the prior art while others, called dummy cells, are blocked at a determined state for indicating to the bus 30 that this cell corresponds to a no-problem case. The software 3 may go examine another register cell. Among the maintained bits, are bits A1 and A2 that control the states of registers 55 and 56 in order to check whether a word has been transferred from register 55 through bus 50 to the RAM and to check if an acknowledgment has been received by register 56. These operations, analogous to the one made by bits A1 and A2 of FIG. 5, are much faster, because they require only a transfer in a RAM memory and not a transfer through a serial connection. However, as regards bus 30, the information, although much faster, appears in an identical form.

FIG. 7 shows an implementation of a register cell, for example a state register cell 54, corresponding to an active cell liable to change its state, like in case of cell 54-1 receiving bit A1. The cell in FIG. 7 is a non-modified cell with respect to a cell of a conventional state register. This cell is mainly disclosed for showing the originality of the modified cells according to the invention shown in FIGS. 8 and 9. This cell, connected with bus 30, comprises an RS flip-flop 60 connected to the bus through a three-state gate or buffer 61. The flip-flop 60 receives on its S input the bit A1. The output Q is connected with the input of gate 61. The control input 62 of gate 61 receives an enable signal from an AND gate 63 receiving on the one hand a read signal R, on the other hand an address signal AD from an address decoder 64 schematically shown as a multi-input AND gate. Practically, the read signal R originates from the control bus associated to the data bus 30 and the inputs of gate 64 originates from the address bus associated to this data bus 30. Additionally, the output of the AND gate 63 is connected with the input R of flip-flop 60. Thus, each time an address signal and a read signal are present for this cell of a register, the state of bit A1 is read and the flip-flop is reset until the next address and read signal for detecting a possible modification of the state of bit A1.

FIG. 8 schematically shows an embodiment of a gulling cell of a register, for example a cell of register 53 replacing the control register 43. Indeed, according to the invention, this register is not useful as it does not control the operating states of the board. However, the bus 30 with its standard software periodically addresses this register for writing control orders and may read this register for checking that the orders have been correctly written. Thus, this cell mainly comprises a D type flip-flop 70, the D input of which is connected with bus 30 and the Q output of which is sent back to the bus 30 through a three state buffer gate 71. A read and write addressing system is provided for. The address is detected by an address decoder schematically shown as a multi-input AND gate 72, the output AD of which is sent back to the first inputs of two AND gates 73 and 74, the second inputs of which respectively receive a write signal W and a read signal R. The output of AND gate 73 is connected to the clock input CK of flip-flop 70 and the output of the AND gate 4 is connected to the enable input of gate 71. Thus, when an address signal and a write signal W are simultaneously present, data is written in flip-flop 70, that is in a suitable cell of the corresponding register. When an address signal and a read signal R are simultaneously present, the three-state gate 71 is enabled and bus 30 reads the state formerly written in the register cell replacing the control register.

FIG. 9 shows a register dummy cell, for example a cell of the state register 54, maintained at a constant state. This cell only comprises a three-state gate 80, the input of which is maintained at a constant level which is shown as being the ground but may correspond to a logic 0 or 1. When the software controlling the bus 30 simultaneously transmits an address signal AD to an input of an address decoder 81 and a read signal R at an input of an AND gate 82, the other input of which receives the output of the address decoder 81, the gate 80 is enabled and the bus 30 reads a predetermined level which corresponds for the control software of this bus to a satisfying state not causing an interruption. This type of cell will be used for the cells 54-3 and 54-4 of register 54 replacing the parity error cells 44-3 and the lost character cell 44-4 of register 44 as, in a communication between a register and a RAM, it is not necessary to make such checking as was necessary in the case of a serial connection.

With the three types of memory cells (normal cell, gulling cell and dummy cell) above disclosed it is possible to maintain all the registers with which the software and the bus of a computer associated with a conventional serial interface were conventionally communicating. Also the software cannot see that the board according to the invention is distinct from a conventional serial interface board. This is the reason for the word simulator and gulling in the above description. The invention does not require modification of the existing standard software and therefore allows full compatibility with such software.

We claim:

1. A data transmission method between a transmitter provided with standard software adapted to a serial interface and a standard receptor provided with a serial interface, the serial interface including a data transmission register, a data reception register, and a control register comprising the following steps:
   (a) simulating a serial interface for the transmitter software, the simulation including the following substeps:
      (a1) transferring data from the data transmission register to a first buffer register;
      (a2) transferring data from a second buffer register to the data reception register; and
      (c2) manipulating bits in the control register to indicate to the standard software that a serial transmission is taking place in which no errors are occurring;
   (b) storing in a memory associated with a microprocessor the data transferred from the data transmission register to the first buffer register and placing in the second buffer register for transfer to the data reception register standard acknowledgement signals: and (c) transmitting to the receptor the data stored in the memory at the rate of the serial connection.

2. A device for transmitting data between a transmitter (1) provided with standard software (3) adapted to a serial interface and a standard receiver (5) provided with a serial interface, further comprising a system for replacing the serial interface of the transmitter comprising the same inputs-outputs and comprising:

a serial interface simulator (31) operating as a serial interface for the transmitter software, the serial interface simulator including a data transmission register into which the standard software places data to be transferred to the standard receiver;

a data reception register from which the standard software receives data pertaining to the transmission of data;

a first buffer register, coupled to the data transmission register, into which is transferred data from the data transmission register;

a second buffer register, coupled to the data reception register, from which is transferred data to the data reception register;

a bus coupled to the first buffer register and the second buffer register;

a simulation control register into which is placed data equivalent to data which would be placed in a control register if error free transmission of data occurred between two serial interfaces; and a simulation state register into which is placed data equivalent to data which would be placed in a state register if error free transmission of data occurred between two serial interfaces;

a memory (33) associated with a microprocessor (32) for receiving at a high speed data from the first buffer register through the bus and sending back standard acknowledgement signals through the bus to the second buffer register; and an interface (34) for transmitting to the receiver data stored in the memory.

3. A data transmission device according to claim 2, wherein the simulation control register and the simulation state register respectively comprise the same cells as a control register and a state register in a conventional serial interface of the transmitter.

4. A data transmission device according to claim 3, wherein the simulation control register comprise read and write gulling cells, the write output of which corresponds to the immediately preceding read input.

5. A data transmission device according to claim 3, wherein the simulation state register comprises cells (54-1, 54-2) which permit the detection of the state of the system in manner similar to the manner in which similar cells in a control register in the serial interface which the serial interface simulator is replacing permits the detection of the state of the system; and dummy cells (54-3, 54-4) maintained at valid fixed levels.

6. A data transmission device according to claim 5, wherein each of the read and write gulling cells comprises a D type flip-flop (70), the clock input (CK) of which is operated by an address signal (AD) and a write signal (W) and Q output of which, identical to the D input immediately preceding, is read with the occurrence of a data signal (AD) and a read signal (R).

7. A data transmission device according to claim 6, wherein each of the dummy cells comprises a control gate (80), the input of which is at a fixed level and that is read when an address signal (AD) and a read signal (R) occur.

* * * * *